United States Patent
Bush, III et al.

(10) Patent No.: US 6,651,100 B2
(45) Date of Patent: Nov. 18, 2003

(54) AUTOMATIC NEGOTIATION OF AN INTERNET PROTOCOL ADDRESS FOR A NETWORK CONNECTED DEVICE

(75) Inventors: James Lesefme Bush, III, Lexington, KY (US); Zachary Nathan Fister, Lexington, KY (US); Samuel William Gardiner, Lexington, KY (US); Thomas Elmer Samples, Lexington, KY (US); Duane E. Norris, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 66 days.

(21) Appl. No.: 10/095,677

(22) Filed: Mar. 12, 2002

(65) Prior Publication Data

US 2003/0177238 A1 Sep. 18, 2003

(51) Int. Cl.7 .............................................. G06F 15/16
(52) U.S. Cl. ........................ 709/224; 709/227; 345/737; 345/745
(58) Field of Search ................................. 709/203, 206, 709/218, 221, 223, 224, 227, 232, 251; 345/733, 737, 745, 859; 710/10, 16, 21

(56) References Cited

U.S. PATENT DOCUMENTS

| | | | | |
|---|---|---|---|---|
| 5,724,510 A | | 3/1998 | Arndt et al. ................. 709/220 |
| 5,822,612 A | | 10/1998 | Thomas et al. ................. 710/6 |
| 5,867,647 A | * | 2/1999 | Haigh et al. ................. 713/200 |
| 5,884,024 A | | 3/1999 | Lim et al. ................... 713/201 |
| 5,922,049 A | | 7/1999 | Radia et al. ................. 709/220 |
| 5,941,952 A | | 8/1999 | Thomas et al. ............. 709/234 |
| 5,963,207 A | * | 10/1999 | Brewer et al. ............... 345/810 |
| 6,009,103 A | | 12/1999 | Woundy ...................... 709/218 |
| 6,023,464 A | | 2/2000 | Woundy ...................... 370/352 |
| 6,052,725 A | | 4/2000 | McCann et al. ............. 709/223 |
| 6,058,425 A | | 5/2000 | White ......................... 709/206 |
| 6,073,178 A | | 6/2000 | Wong et al. ................. 709/229 |
| 6,115,545 A | | 9/2000 | Mellquist .................... 709/220 |
| 6,128,664 A | | 10/2000 | Yanagidate et al. ......... 709/203 |
| 6,195,171 B1 | | 2/2001 | Ochiai ........................ 358/1.15 |
| 6,212,563 B1 | | 4/2001 | Beser ......................... 709/217 |
| 6,216,159 B1 | | 4/2001 | Chintakrindi et al. ....... 709/227 |
| 6,219,715 B1 | | 4/2001 | Ohno et al. .................. 709/103 |
| 6,230,012 B1 | * | 5/2001 | Willkie et al. ........... 455/435.1 |
| 6,243,749 B1 | | 6/2001 | Sitaraman et al. .......... 709/223 |
| 6,249,813 B1 | | 6/2001 | Campion et al. ............ 709/222 |
| 6,266,340 B1 | * | 7/2001 | Pickett et al. ................ 370/442 |
| 6,496,851 B1 | * | 12/2002 | Morris et al. ............... 709/204 |
| 6,496,867 B1 | * | 12/2002 | Beser et al. ................ 709/245 |
| 6,563,821 B1 | * | 5/2003 | Hong et al. ................. 370/389 |

* cited by examiner

*Primary Examiner*—Hosain T. Alam
*Assistant Examiner*—Khanh Quang Dinh
(74) *Attorney, Agent, or Firm*—Taylor & Aust, P.C.

(57) ABSTRACT

A method for negotiating an Internet Protocol (IP) address for an imaging apparatus connected to a network includes the steps of controlling network communication between the imaging apparatus and the network; defining an imaging state when the imaging apparatus is available for imaging, wherein during the imaging state the imaging apparatus waits in an idle state during periods of non-imaging; defining an automatic IP address negotiation state when the imaging apparatus is not available for imaging; if the imaging apparatus is in the idle state, then determining whether the imaging apparatus should leave the imaging state and enter the automatic IP address negotiation state; and when the imaging apparatus is in the automatic IP address negotiation state, then attempting to automatically assign an IP address to the imaging apparatus.

10 Claims, 6 Drawing Sheets

AUTOMATIC NEGOTIATION OF AN INTERNET PROTOCOL ADDRESS FOR A NETWORK CONNECTED DEVICE

BACKGROUND OF THE INVENTION

1. Field of the Invention

The present invention relates to a method of negotiating Internet Protocol (IP) addresses, and, more particularly, to automatically negotiating an IP address for a device connected to a network via network hardware, such as a reduced feature network adapter. Such automatic negotiation can include, for example, the automatic assignment of an IP address or the renewal of a lease of an existing IP address.

2. Description of the Related Art

It is known for a peripheral device, such as a printer, to be connected to a network, such as an Ethernet Local Area Network (LAN) operating with TCP/IP as a network protocol, in order to allow a number of network connected appliances, such as servers, computers or hosts, to each have access to the shared peripheral device. In order to function over the network, the shared peripheral device connected to the network must have an Internet Protocol (IP) address that the network connected appliances use to direct communications to the shared peripheral device.

Dynamic Host Configuration Protocol (DHCP) is a protocol for assigning dynamic IP addresses to devices on a TCP/IP network. DHCP is well defined by RFC 2131, a document issued by the Internet Engineering Task Force (IETF). With dynamic addressing, a device can have a different IP address every time it connects to the network. In some systems, the device's IP address can even change while it is still connected. DHCP also supports a mix of static and dynamic IP addresses. DHCP simplifies network administration because software keeps track of IP addresses rather than requiring an administrator to manage the task. This means that, for example, a new computer can be added to a network without the additional task of manually assigning a unique IP address to the new computer.

Through DHCP, a device connected to a network requests an IP address from a DHCP server that also is connected to the network. The DHCP server can then assign an IP address to the device for a specified lease period. The device is then responsible for renewing that lease if it wishes to continue using that IP address after the expiration of the lease. The DHCP protocol requires considerable processing power to create DHCP network packets, choose offers from the DHCP servers, and keep track of lease time periods.

A reduced feature network adapter can be used to connect a printer to a network, such as an Ethernet LAN. Such reduced feature network adapters possess minimal hardware and processing capability. As such, the cost of adding networking capability to printers is greatly reduced. In order to keep the cost of the reduced feature network adapter low, some features that facilitate network connectivity and that save time and effort for the network user are not provided. Such features not currently available in association with a reduced feature network adapter include, for example, the automatic assignment of IP addresses using DHCP, i.e., using DHCP to obtain and use an IP address. In lieu of automatic assignment of IP addresses, the reduced feature network adapter utilizes a proprietary networking protocol to assign an IP address in specific networking environments, but require the user to manually assign IP addresses in all other cases.

What is needed in the art is a method that allows automatic negotiation of IP addresses, such as by utilizing DHCP, for a peripheral device connected to a network via a reduced feature network adapter.

SUMMARY OF THE INVENTION

In one embodiment, the present invention provides a method that allows automatic negotiation of IP addresses, such as by utilizing DHCP, for a peripheral device connected to a network via networking hardware, such as a reduced feature network adapter. However, it is recognized that embodiments of the present invention could also be utilized with full-featured networking hardware.

In one form thereof, the present invention relates to a method for negotiating an Internet Protocol (IP) address for an imaging apparatus connected to a network. The method includes the steps of controlling network communication between the imaging apparatus and the network; defining an imaging state when the imaging apparatus is available for imaging, wherein during the imaging state the imaging apparatus waits in an idle state during periods of non-imaging; defining an automatic IP address negotiation state when the imaging apparatus is not available for imaging; determining whether the imaging apparatus is in the idle state; if the imaging apparatus is in the idle state, then determining whether the imaging apparatus should leave the imaging state and enter the automatic IP address negotiation state; and when the imaging apparatus is in the automatic IP address negotiation state, then attempting to automatically assign an IP address to the imaging apparatus.

In another form thereof, the present invention relates to an imaging apparatus including an imaging engine having firmware defining logic and processing functions, and networking hardware communicatively coupled to the firmware. The firmware and the networking hardware selectably provide an imaging state and an automatic IP address negotiation state. When the imaging apparatus is in the imaging state then the imaging apparatus is available for imaging, and wherein during the imaging state the imaging apparatus waits in an idle state during periods of non-imaging. When the imaging apparatus is in the automatic IP address negotiation state, the imaging apparatus is not available for imaging. If the imaging apparatus is in the idle state, then the firmware determines whether the imaging apparatus should leave the imaging state and enter the automatic IP address negotiation state. When the imaging apparatus is in the automatic IP address negotiation state, then the firmware is adapted to attempt automatic assignment of an IP address to the imaging apparatus.

In still another form thereof, the present invention relates to a method of communicating with a shared imaging apparatus connected to a computer network, wherein communication over the network is facilitated through use of network packets. The method includes the steps of providing the shared imaging apparatus with networking hardware; providing the shared imaging apparatus with imaging apparatus firmware; defining a data channel associated with the networking hardware; instructing the networking hardware to accept information on the data channel from a user that owns the data channel; processing automatic Internet Protocol (IP) address negotiation network packets with the imaging apparatus firmware when the data channel is not owned; and processing second types of network packets, different from the automatic IP address negotiation network packets, by the networking hardware of the shared imaging apparatus when the data channel is owned.

An advantage of one embodiment of the present invention is that a network device having a reduced feature network adapter can be adapted to facilitate DHCP IP address negotiation in a seamless manner within a networking environment.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates embodiments of the invention, and such exemplification is not to be construed as limiting the scope of the invention in any manner.

DETAILED DESCRIPTION OF EXEMPLARY EMBODIMENTS

Figure 1:
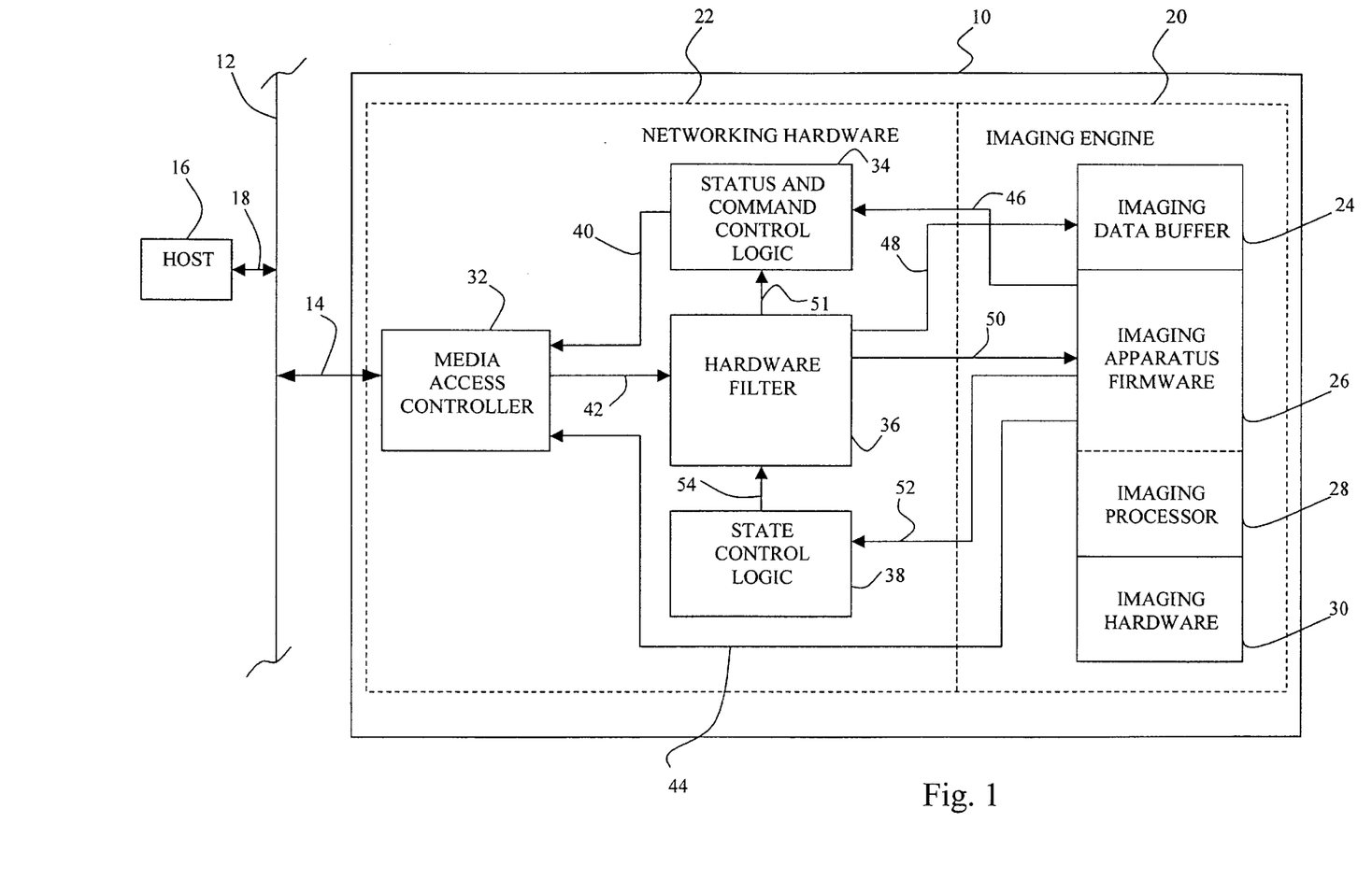
FIG. 1 is a block diagram of one embodiment of a network system including the present invention.

Referring now to the drawings and particularly to FIG. 1, there is shown an imaging apparatus 10 connected to a network 12, such as an Ethernet local area network (LAN), via a bi-directional communications link 14. Also shown is a host 16, such as a personal computer, that is communicatively coupled to network 12 via a bi-directional communications link 18. In one embodiment, the present invention adds automatic IP address negotiation capability to imaging apparatus 10, such as by utilizing DHCP, while preserving the low cost advantages of networking hardware that normally would have reduced features.

Imaging apparatus 10, which serves as a shared networking appliance, includes an imaging engine 20 communicatively coupled to networking hardware 22. Imaging engine 20 includes an imaging data buffer 24, imaging apparatus firmware 26, an imaging processor 28 and imaging hardware 30. Imaging data buffer 24 includes random access memory (RAM) used to temporarily store image data and associated imaging commands. Imaging apparatus firmware 26 includes non-volatile memory, such as for example read only memory (ROM), flash memory, or electrically erasable programmable ROM (EEPROM), and defines logic and processing functions executed by imaging processor 28. Imaging processor 28 includes a microprocessor and associated RAM and ROM. Imaging hardware 30 can be, for example, the hardware mechanisms of an ink jet printer or laser printer, which are well known in the art.

Networking hardware 22, which may be for example a reduced feature network adapter, includes a media access controller 32, status and command control logic 34, a hardware filter 36 and state control logic 38. Media access controller 32 is connected to network 12 via bi-directional communications link 14 and facilitates communications over specific types of networks, such as, for example, Ethernet. Media access controller 32 also is connected to receive status information regarding imaging apparatus 10 from status and command control logic 34 via a communications path 40. Media access controller 32 is connected to provide data received from network 12 in the form of network packets to hardware filter 36 via a communications path 42. Media access controller 32 is connected to receive data, such as DHCP packets, from imaging apparatus firmware 26 via a communications path 44. Status and command control logic 34 is connected to receive imaging apparatus status information from imaging apparatus firmware 26 via a communications path 46.

Hardware filter 36 is connected to provide received network packets including image data and associated imaging commands to imaging data buffer 24 via a data channel 48. Hardware filter 36 is connected to provide received network packets, such as DHCP packets, including network data and associated network commands to imaging apparatus firmware 26 via communications path 50. Hardware filter 36 is connected to deliver instructions to status and command control logic 34 via command channel 51. State control logic 38 is connected to receive data from imaging apparatus firmware 26 via a communications path 52. State control logic 38 is connected to provide state selection instructions to hardware filter 36 via a communications path 54.

Data channel 48 is used to send print objects from a workstation host-based printing driver of host 16 to imaging apparatus 10 using a "payload" field in a frame of a imaging network packet, such as in a packet associated with a proprietary protocol having predefined commands. To minimize complexity and thus minimize cost of 30 networking hardware 22, in one embodiment hardware filter 36 only permits one workstation, such as host 16, to "own" data channel 48 at any given point in time. In an exemplary embodiment, any information destined for data channel 48 that does not originate from the host "owner" is immediately discarded by hardware filter 36.

Command channel 51 is used to signal the networking hardware 22 of command activity. Any host-based networking appliance can send commands via network packets to networking hardware 22 which are processed by media access controller 32 and hardware filter 36. Various command signals can be defined. For example, the signals "connect", "close", "terminate" and "status" can be defined as follows. "Connect" is a request to acquire data channel 48 with a desire to send data. "Close" is a request to release data channel 48. "Terminate" is a request to release data channel 48 and abort a print job. In one scenario, only a host-based network appliance, such as host 16, that is the owner of data channel 48 can send a "close" command. "Status" is a request for printer status with no desire to send data. Networking hardware 22 will respond with a status response to a status request command destined for command channel 51 received from any user while imaging apparatus 10 is in an imaging state.

To facilitate printing, the print driver loaded in a workstation, such as host 16, creates host-based networking printer specific data packets in a format compliant with the predefined protocol and delivers the data packets in order and unaltered to a host-based networking printer, such as imaging apparatus 10. Workstation host-based networking print drivers are designed to cooperate in order to facilitate the "fair-sharing" of the host-based networking printer amongst a number of workstations. To exist concurrently with other networking appliances, a common standard for transporting data on the medium must be adhered to by all devices. For example, DIX or IEEE 802.3 defines the standard for Ethernet. In adhering to the standard, each device will have a universally administered address (UAA). Also, to communicate on TCP/IP networks, each network-connected device will have a unique IP address. Further adherence dictates that the host-based networking appliances will use these addresses to exchange basic units of data (frames) in networking packets. The addresses are used by networking hardware 22 to deliver the frame to an intended destination.

As a simplified example, and assuming that imaging apparatus already has an IP address, communications is initiated by host 16 with imaging device 10 via network 12 and communications links 14 and 18. Host 16 obtains ownership of data channel 48 and provides image data and associated imaging commands in the form of network packets to imaging apparatus 10, which is processed and stored in imaging data buffer 24. During image formation, imaging processor 28 executes imaging instructions stored in imaging apparatus firmware 26 to retrieve the image data and associated imaging commands that are stored in imaging data buffer 24. Imaging processor 28 then processes the retrieved image data and associated imaging commands to generate signals to control the operation of imaging hardware 30 to form a printed image.

It is known that in some networking environments the IP address of a network-connected device can be statically assigned, or may be dynamically assigned. However, in order to utilize dynamic assignment, such as by utilizing DHCP, the receiving device must be capable of handling the associated automatic IP address negotiation network packets, such as DHCP packets. In general, with one embodiment of the present invention, by processing automatic IP address negotiation network packets by imaging apparatus firmware 26, while using networking hardware 22 to perform many of the networking protocol functions, such as for example those associated with any proprietary protocol, the cost of adding an automatic IP address negotiation protocol such as DHCP to imaging apparatus 10 is minimized. This is accomplished, in part, by providing imaging apparatus 10 with an "imaging state" when imaging apparatus 10 is available for imaging but is not available for automatic IP address negotiation, and by providing imaging apparatus 10 with an "automatic IP address negotiation state" when the imaging apparatus is not available for imaging, but when automatic IP address negotiation can be attempted.

A method according to one embodiment of the present invention is described in further detail with reference to FIGS. 2 and 3A–3D. To simplify the discussion, the method that follows will be described with respect to a DHCP environment, however, those skilled in the art will recognize that the principles of the invention may be applied to other automatic IP address negotiation protocols without departing from the spirit of the invention.

Figure 2:
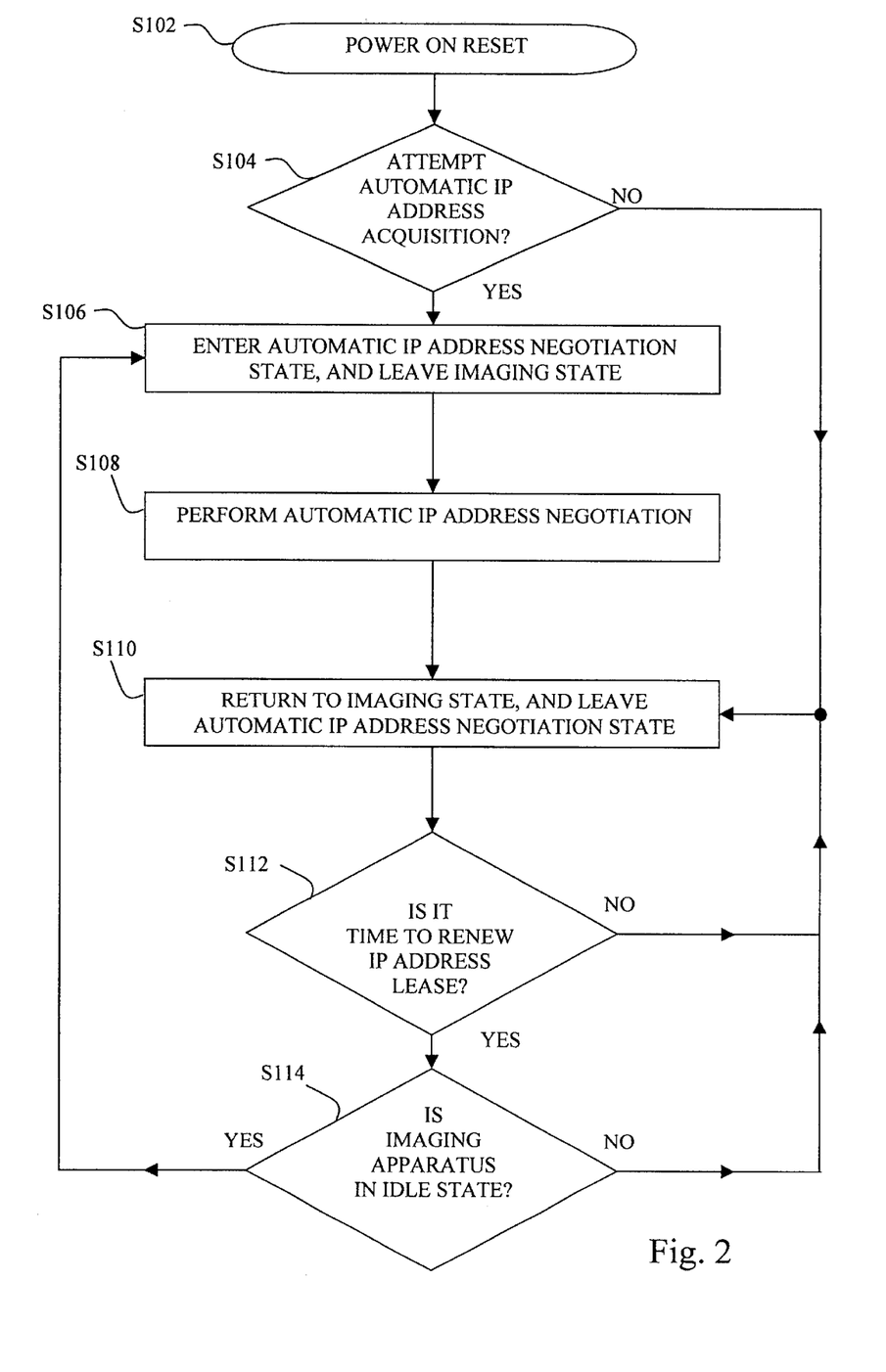
FIG. 2 is a general flow chart of a method of the present invention.

At step S102, it is assumed that imaging apparatus 10 has just undergone a power on reset. At step S104, it is determined whether to attempt automatic IP address acquisition. Imaging apparatus firmware 26 will make this determination based on a variety of factors, including for example, whether a maximum number of attempts has been made to automatically assign an IP address, having already acquired a valid IP address and lease time, having been assigned an IP address manually, or if the automatic assignment function has been disabled. Thus, if this determination is NO, then the process proceeds to step S110 to assure that imaging apparatus 10 is placed in the imaging state, which will be further described below. If YES, then the process proceeds to step S106.

At step S106, imaging apparatus firmware 26 provides an instruction signal to state control logic 38 to enter the automatic IP address negotiation state, and leave the imaging state, the next time imaging apparatus 10 reaches an idle state. Imaging apparatus firmware 26, state control logic 38 and hardware filter 36 determine what types of network packets will be passed, and the destination of the passed network packets. While in the automatic IP address negotiation state, data channel 48 is not owned, and state control logic 38 instructs hardware filter 36 to block any imaging data destined for imaging data buffer 24 and to block any proprietary network command packets. Control logic 38 further instructs hardware filter 36 to send DHCP packets to be processed by imaging apparatus firmware 26.

At step S108, automatic IP address negotiation is performed. The details of one embodiment of step S108 will be discussed in further detail below with respect to FIGS. 3A–3D. The results of the automatic IP address negotiation may be, for example, the successful automatic assignment of an IP address and lease, a failure to successfully negotiate an automatic assignment of an IP address and lease, the successful renewal of a current IP address, or a failure to successfully negotiate a renewal of a current IP address.

At step S110, imaging apparatus firmware 26 provides an instruction signal to state control logic 38 to enter the imaging state, and leave the automatic IP address negotiation state. While in the imaging state, state control logic 38 instructs hardware filter 36 to send imaging data packets received from the owner of data channel 48 to imaging data buffer 24, instructs hardware filter 36 to send commands to status and logic command logic 34, and instructs hardware filter 36 to block other network packets, including DHCP packets.

At step S112, it is determined whether it is time to renew the current IP address lease. If NO, then the process returns to step S110. If YES, the process proceeds to step S114.

At step S114 it is determined whether imaging apparatus 10 is in an idle state. The idle state is a sub-state of the imaging state. When imaging apparatus 10 is in the idle state, data channel 48 is not owned by a user, such as host 16. During the imaging state, the imaging apparatus waits in the idle state during periods of non-imaging. It is during the idle state that it is permissible to return to step S106 to enter the automatic IP address negotiation state, and leave the imaging state. If, however, at step S114 it is determined that imaging apparatus 10 is not in an idle state, then data channel 48 is owned and the process returns back to step S110, essentially remaining in the imaging state until it is time to renew the current IP address lease and imaging apparatus 10 is in the idle state.

The details of step S108 of FIG. 2 now will be discussed in further detail with respect to FIGS. 3A–3D.

Figure 3A:
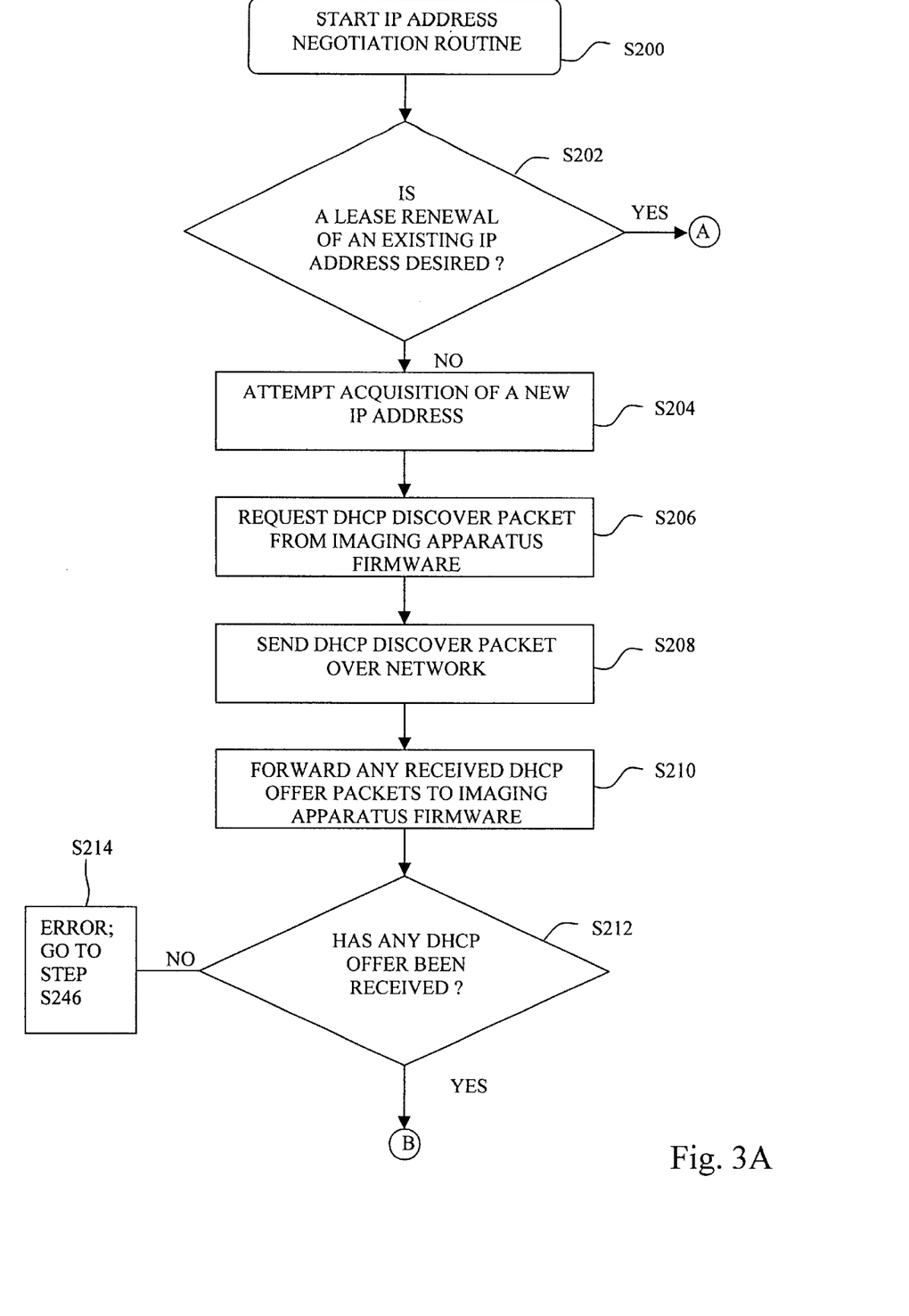
FIGS. 3A–3D are flow charts which describe in further detail the automatic IP address negotiation step of FIG. 2.

Step S200 represents the start of the automatic IP address negotiation routine.

At step S202, it is determined whether a lease renewal of an existing IP address is desired. If YES, then the process proceeds to an IP address lease renewal routine, such as the one depicted by the flowchart of FIG. 3D, which will be described in further detail below. If NO, however, then the process proceeds to step S204.

At step S204, it is identified that acquisition of a new IP address for imaging apparatus 10 is to be attempted. In essence, this attempt is effected by steps S206–S250 of FIGS. 3A–3C.

At step S206, networking hardware 22 requests that imaging apparatus firmware 26 construct a DHCP discover packet.

At step S208, imaging apparatus firmware 26 responds by sending the DHCP discover packet to media access controller 32 via communications path 44, which in turn sends the DHCP discover packet over network 12.

At step S210, any DHCP offer packets received by media access controller 32 is forwarded via hardware filter 36 to be processed by imaging apparatus firmware 26. It is the imaging apparatus firmware 26 then that decides how to respond to the receipt of DHCP offer packets, or the failure to receive any DHCP offer packets.

At step S212, imaging apparatus firmware 26 determines whether any DHCP offer has been received. If NO, then at step S214 it is decided that an error condition has occurred, at which time the process proceeds to step S246 (see FIG. 3C), to determine whether the maximum number of attempts have been exceeded. If at least one DHCP offer has been received, then the process proceeds to step S216.

At step S216, imaging apparatus firmware 26 chooses one of the DHCP offer packets to respond to. Such a selection can be, for example, a random selection.

At step S218, imaging apparatus firmware 26 constructs a DHCP request packet.

Figure 3B:
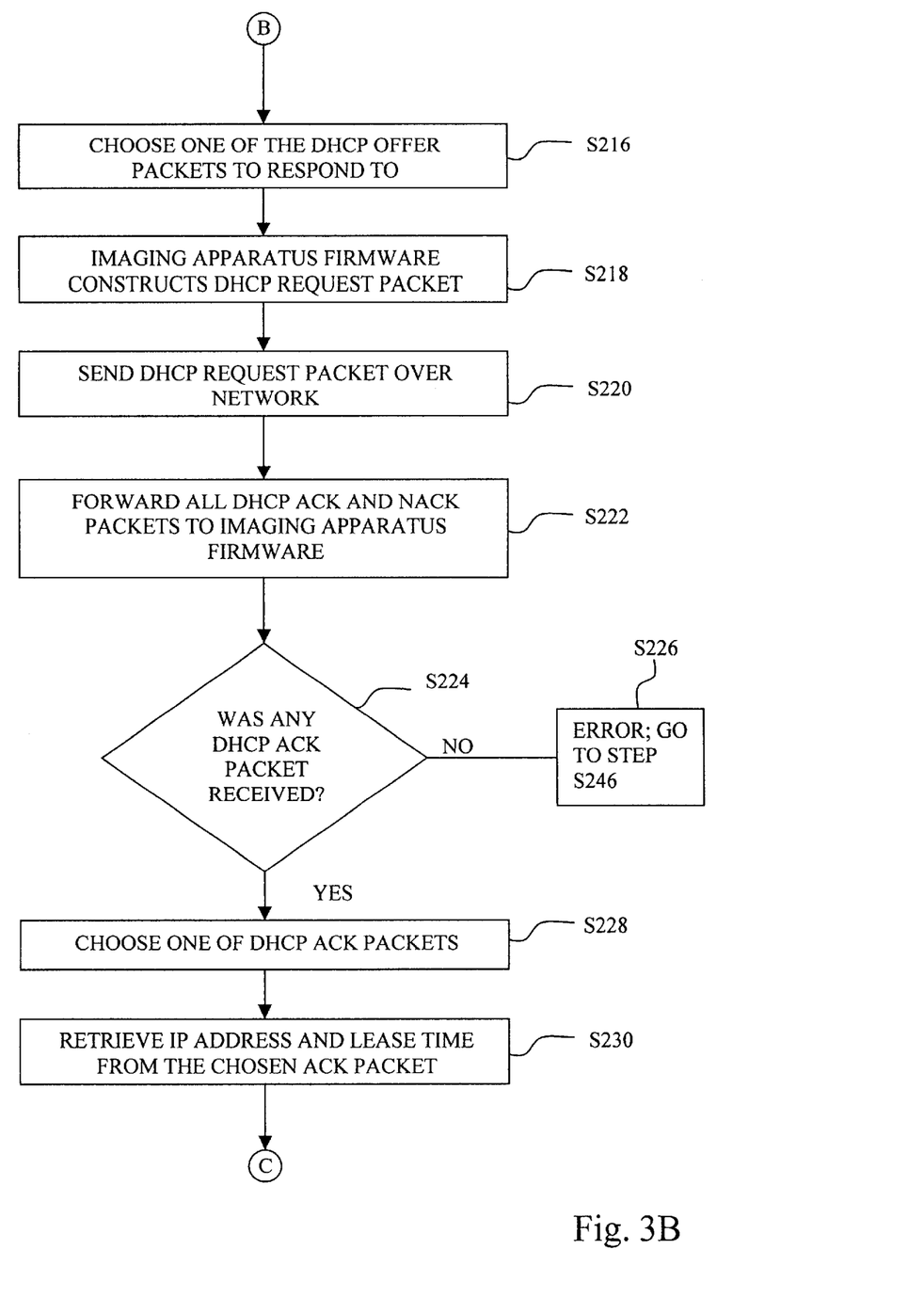

At step S220, imaging apparatus firmware 26 then sends the DHCP request packet to media access controller 32 via communications path 44, which in turn sends the DHCP request packet over network 12. Devices, such as host 16 functioning as a DHCP server, respond to the DHCP request packet with either DHCP ACK (acknowledge) packets, or DHCP NACK (not acknowledge) packets.

At step S222, the DHCP ACK and NACK packets are received by media access controller 32, which in turn forwards the DHCP ACK and NACK packets via hardware filter 36 to be processed by imaging apparatus firmware 26.

At step S224, imaging apparatus firmware 26 determines whether any DHCP ACK packets were received. If NO, then at step S226 it is decided that an error condition has occurred, at which time the process proceeds to step S246 (see FIG. 3C), to determine whether the maximum number of attempts have been exceeded. If at least one DHCP ACK packet has been received, then the process proceeds to step S228.

At step S228, imaging apparatus firmware 26 chooses one of the DHCP ACK packets. Such a selection can be, for example, a random selection.

At step S230, imaging apparatus firmware 26 retrieves the IP address and the IP address lease time from the chosen DHCP ACK packet.

At step S232 (see FIG. 3C), imaging apparatus firmware 26 then constructs an Address Resolution Protocol (ARP) request packet.

Figure 3C:
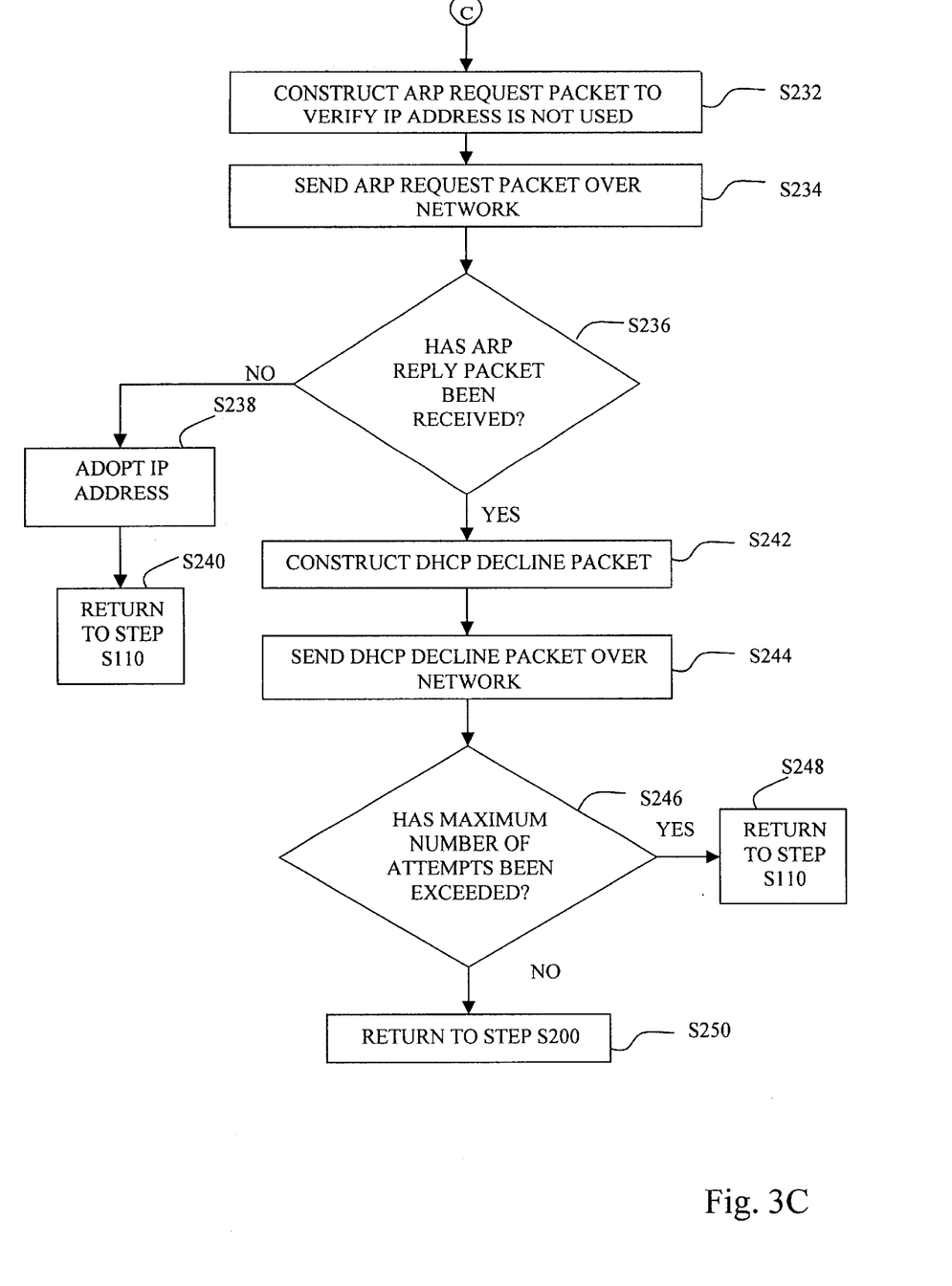

At step S234, imaging apparatus firmware 26 then sends the ARP request packet to media access controller 32 via communications path 44, which in turn sends the ARP request packet over network 12.

At step S236, imaging apparatus firmware 26 determines whether any ARP reply packet has been received. If NO the process proceeds to step S238, wherein the IP address and lease time present in the chosen DHCP ACK packet are adopted by networking hardware 22. The process proceeds to step S240, where the process is directed back to step S110 (FIG. 2).

At step S236, if imaging apparatus firmware 26 determines that an ARP reply packet has been received, then the process proceeds to step S242.

At step S242, imaging apparatus firmware 26 then constructs a DHCP decline packet.

At step S244, imaging apparatus firmware 26 then sends the DHCP decline packet to media access controller 32 via communication path 44, which in turn sends the DHCP decline packet over network 12.

At step S246, imaging apparatus firmware 26 determines whether a maximum number of attempts to automatically assign an IP address have been exceeded. If YES, at step S248 the process returns to step S110, wherein imaging apparatus 10 enters the imaging state, and leaves the automatic IP address negotiation state.

However, if at step S246 it is determined that a maximum number of attempts to automatically assign an IP address have not been exceeded, then the process returns back to step S200 (FIG. 3A) to again start of the automatic IP address negotiation routine.

Figure 3D:
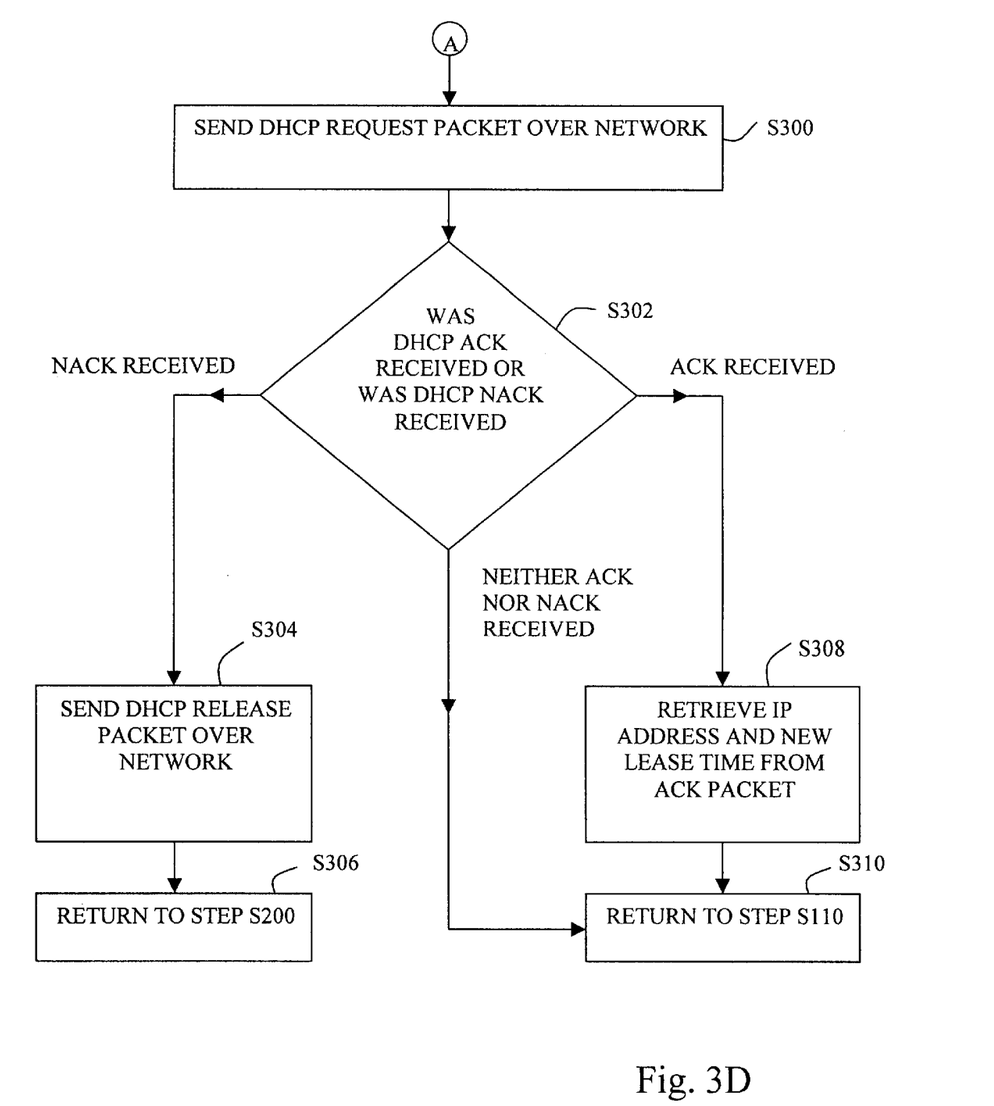

As set forth above, if at step S202 (FIG. 3A) it is determined that an IP address lease renewal is desired, then the acquisition of a new IP address is not attempted, but rather, the process proceeds to step S300 to execute the IP address lease renewal routine, such as that depicted by the flowchart of FIG. 3D.

At step S300, imaging apparatus firmware 26 constructs a DHCP request packet to request a renewal of the lease of the current IP address. Imaging apparatus firmware 26 then sends the DHCP request packet to media access controller 32 via communications path 44, which in turn sends the DHCP request packet over network 12. The DHCP ACK and NACK packets are received by media access controller 32, which in turn forwards the DHCP ACK and/or NACK packets via hardware filter 36 to imaging apparatus firmware 26.

At step S302, imaging apparatus firmware 26 determines whether any DHCP ACK or NACK packets were received.

If, at step S302, at least one NACK packet and no ACK packet are received, then at step S304 imaging apparatus firmware 26 constructs a DHCP release packet. Imaging apparatus firmware 26 then sends the DHCP release packet to media access controller 32 via communications path 44, which in turn sends the DHCP release packet over network 12. Then, at step S306, the process returns to step S200 to again start the automatic IP address negotiation routine.

If, at step S302, an ACK packet is received, then the process proceeds to step S308.

At step S308, imaging apparatus firmware 26 retrieves the IP address and the new IP address lease time from the DHCP ACK packet and the new IP address lease time is adopted by networking hardware 22. Then at step S310, the process proceeds to step S110 (FIG. 2), wherein imaging apparatus 10 enters the imaging state, and leaves the automatic IP address negotiation state. In an exemplary embodiment, while in the automatic IP address negotiation state, data channel 48 cannot be owned by a network appliance, such as host 16, connected to network 12. However, when in the imaging state, data channel 48 is available to be owned by a network appliance connected to network 12.

If, at step S302, neither an ACK packet nor a NACK packet is received, then the process proceeds to step S310, and the process returns to step S110 wherein imaging apparatus 10 enters the imaging state, and leaves the automatic IP address negotiation state.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method for negotiating an Internet Protocol (IP) address for an imaging apparatus connected to a network, comprising the steps of:

controlling network communication between said imaging apparatus and said network;

defining an imaging state when said imaging apparatus is available for imaging, wherein during said imaging state said imaging apparatus waits in an idle state during periods of non-imaging;

defining an automatic IP address negotiation state when said imaging apparatus is not available for imaging;

determining whether said imaging apparatus is in said idle state;

if said imaging apparatus is in said idle state, then determining whether said imaging apparatus should leave said imaging state and enter said automatic IP address negotiation state; and when said imaging apparatus is in said automatic IP address negotiation state, then attempting to automatically assign a first IP address to said imaging apparatus.

2. The method of claim 1, further comprising the steps of determining whether the step of attempting to automatically assign said first IP address to said imaging apparatus is complete, and if so, then said imaging apparatus leaves said automatic IP address negotiation state and enters said imaging state.

3. The method of claim 1, wherein said imaging apparatus includes networking hardware having a data channel, wherein when said imaging apparatus is in said idle state, said data channel is not owned by a user.

4. The method of claim 1, wherein said automatic IP address negotiation state comprises the step of attempting to renew a lease of a current IP address.

5. The method of claim 4, further comprising the steps of determining whether the step of attempting to renew said lease of said current IP address is complete, and if so, then said imaging apparatus leaves said automatic IP address negotiation state and enters said imaging state.

6. An imaging apparatus, comprising:

an imaging engine having firmware defining logic and processing functions; and networking hardware communicatively coupled to said firmware, said firmware and said networking hardware selectably providing an imaging state and an automatic Internet Protocol (IP) address negotiation state, wherein when said imaging apparatus is in said imaging state then said imaging apparatus is available for imaging, and wherein during said imaging state said imaging apparatus waits in an idle state during periods of non-imaging, wherein when said imaging apparatus is in said automatic IP address negotiation state, said imaging apparatus is not available for imaging, wherein if said imaging apparatus is in said idle state, then said firmware determines whether said imaging apparatus should leave said imaging state and enter said automatic IP address negotiation state; and when said imaging apparatus is in said automatic IP address negotiation state, then said firmware being adapted to attempt automatic assignment of an IP address to said imaging apparatus.

7. The imaging apparatus of claim 6, wherein said networking hardware comprises:

a media access controller communicatively coupled to said firmware; and a hardware filter communicatively coupled to said media access controller and communicatively coupled to said firmware, said media access controller being adapted for sending and receiving Dynamic Host Configuration Protocol (DHCP) packets over said network, wherein during said automatic IP address negotiation state, said media access controller forwards received first DHCP packets to said hardware filter, which in turn passes said received first DHCP packets to be processed by said firmware, and said firmware constructing second DHCP packets and forwarding said second DHCP packets to said media access controller while bypassing said hardware filter.

8. The imaging apparatus of claim 7, wherein said networking hardware includes a data channel, wherein when said imaging apparatus is in said idle state, said data channel is not owned by a user.

9. The imaging apparatus of claim 7, further comprising an imaging buffer communicatively coupled to said hardware filter, wherein when said imaging apparatus is in said automatic IP address negotiation state, then said hardware filter does not pass imaging data packets to said imaging buffer, and when said imaging apparatus is in said imaging state said networking hardware passes imaging data packets to said imaging buffer.

10. The imaging apparatus of claim 7, wherein during said imaging state, said hardware filter prevents said first DHCP packets from being processed by said firmware.

* * * * *